US012567389B2

(12) United States Patent
Hirama et al.

(10) Patent No.: US 12,567,389 B2
(45) Date of Patent: Mar. 3, 2026

(54) DATA COMMUNICATION SYSTEM, AND DISPLAY DEVICE

(71) Applicant: LAPIS Technology Co., Ltd., Yokohama (JP)

(72) Inventors: Atsushi Hirama, Yokohama (JP); Koji Higuchi, Yokohama (JP); Hideaki Hasegawa, Yokohama (JP)

(73) Assignee: LAPIS Technology Co., Ltd., Yokohama (JP)

( * ) Notice: Subject to any disclaimer, the term of this patent is extended or adjusted under 35 U.S.C. 154(b) by 0 days.

(21) Appl. No.: 18/666,788

(22) Filed: May 16, 2024

(65) Prior Publication Data

US 2024/0395222 A1 Nov. 28, 2024

(30) Foreign Application Priority Data

May 23, 2023 (JP) ................................. 2023-084287

(51) Int. Cl.
*G09G 3/36* (2006.01)

(52) U.S. Cl.
CPC ......... *G09G 3/3688* (2013.01); *G09G 3/3607* (2013.01); *G09G 2310/08* (2013.01)

(58) Field of Classification Search
CPC .......... G11B 20/10009; G11B 20/1488; G11B 2005/0018; G11B 27/3027
See application file for complete search history.

(56) References Cited

U.S. PATENT DOCUMENTS

| | | | | | |
|---|---|---|---|---|---|
| 5,825,570 | A * | 10/1998 | Kanegae | G11B 20/1488 360/65 |
| 10,515,578 | B2 * | 12/2019 | Yabuki | H04L 25/03866 |
| 10,600,346 | B2 * | 3/2020 | Kim | G09G 3/006 |
| 10,762,839 | B2 * | 9/2020 | Bae | G06F 3/0416 |
| 11,062,641 | B2 * | 7/2021 | Yamasaki | G09G 3/3666 |
| 11,100,883 | B2 * | 8/2021 | Yamamoto | G09G 3/3688 |
| 11,195,443 | B2 * | 12/2021 | Wang | H03K 3/0375 |
| 11,605,354 | B2 * | 3/2023 | Hong | G09G 3/2096 |
| 12,118,929 | B2 * | 10/2024 | Ha | G09G 3/2096 |
| 2005/0232637 | A1 * | 10/2005 | Paillet | H04B 10/66 398/140 |

FOREIGN PATENT DOCUMENTS

JP 2013231939 11/2013

* cited by examiner

*Primary Examiner* — Van N Chow
(74) *Attorney, Agent, or Firm* — JCIPRNET

(57) ABSTRACT

A data communication system includes a transmission circuit including an encoder that receives an information data piece composed of N (N is an integer of 2 or greater) bits and generates a converted information data piece in a serial form composed of first to N-th bits representing a value, which is obtained by adding 1 to a value represented by the information data piece, and transmitting an information data signal including the converted information data piece, and a reception circuit including a PLL circuit that receives the information data signal and generates a clock signal that is phase-synchronized with a rising edge or a falling edge of the information data signal, and a decoder that receives the information data signal and subtracts 1 from the value represented by the information data piece included in the information data signal to restore the information data piece.

8 Claims, 5 Drawing Sheets

DATA COMMUNICATION SYSTEM, AND DISPLAY DEVICE

CROSS-REFERENCE TO RELATED APPLICATION

This application claims the priority benefit of Japan application serial no. 2023-084287, filed on May 23, 2023. The entirety of the above-mentioned patent application is hereby incorporated by reference herein and made a part of this specification.

BACKGROUND

Technical Field

The disclosure relates to a data communication system that transmits and receives digital data for each of data blocks, and a display device including the data communication system.

Related Art

A liquid crystal display device as a display device includes a display panel in which a plurality of gate lines and a plurality of data lines are disposed to intersect each other and pixels are formed at intersections between the gate lines and the data lines, and a drive circuit for driving the display panel (see, for example, Patent Document 1: Japanese Patent Application Laid-Open No. 2013-231939). The drive circuit includes a gate driver for driving the plurality of gate lines, a source driver for driving the plurality of data lines, and a timing controller for controlling this gate driver and source driver. The timing controller receives a video signal and transmits, to the source driver, a video data signal in a serial form in which control signals such as horizontal and vertical synchronization signals and clock bits are added to a bit sequence of video data based on the video signal.

The source driver that receives such a video data signal extracts a clock bit from the video data signal, and generates an internal clock signal that is phase-synchronized with the clock bit by using a phase locked loop (PLL) circuit. Then, the source driver takes in a sequence of video data bits included in the received video data signal in synchronization with the internal clock signal described above, converts the taken-in sequence of the video data bits into analog data voltages in units of pixels, and supplies the analog data voltages to a plurality of data lines of the display panel.

Thus, in the liquid crystal display device disclosed in Patent Document 1, when the timing controller transmits the video data signal to the source driver, the clock bit is added to the video data signal, and thus there is a problem that communication efficiency is reduced by the amount of the clock bit.

SUMMARY

According to an embodiment, a data communication system includes a transmission circuit including an encoder that receives an information data piece composed of N (N is an integer of 2 or greater) bits and generates a converted information data piece in a serial form composed of first to N-th bits representing a value, which is obtained by adding 1 to a value represented by the information data piece, and transmitting an information data signal including the converted information data piece, and a reception circuit including a PLL circuit that receives the information data signal and generates a clock signal that is phase-synchronized with a rising edge or a falling edge of the information data signal, and a decoder that receives the information data signal and subtracts 1 from the value represented by the converted information data piece included in the information data signal to restore the information data piece.

According to an embodiment, a data communication system includes a transmission circuit including an encoder that receives an information data piece composed of N (N is an integer of 2 or greater) bits and generates a converted information data piece in a serial form composed of first to N-th bits representing a value, which is obtained by subtracting 1 from a value represented by the information data piece, and transmitting an information data signal including the converted information data piece, and a reception circuit including a PLL circuit that receives the information data signal and generates a clock signal that is phase-synchronized with a rising edge or a falling edge of the information data signal, and a decoder that receives the information data signal and adds 1 to the value represented by the converted information data piece included in the information data signal to restore the information data piece.

According to an embodiment, a display device includes a display panel that has n (n is an integer of 2 or greater) data lines to which a plurality of display cells are connected, a data driver that drives the display panel, and a timing controller that includes a transmission circuit including an encoder and transmitting an information data signal including a sequence of converted information data pieces to the data driver, the encoder generating a value, which is obtained by adding 1 to a value represented by an information data piece, as the sequence of the converted information data pieces represented in a form of serial first to N-th bits, with respect to each of information data pieces of N (N is an integer greater than K) bits obtained by performing color depth expansion processing for expanding a color depth for each of display data pieces in which a luminance level of each of the display cells based on a video signal is represented by K (K is an integer of 2 or greater) bits, in which the data driver includes a reception circuit including a PLL circuit that receives the information data signal and generates a clock signal that is phase-synchronized with a rising edge or a falling edge of the information data signal, and a decoder that receives the information data signal and subtracts 1 from the value represented by the converted information data piece with respect to each of the converted information data pieces included in the information data signal to restore the information data piece, a data taking-in part taking in and outputting n information data pieces in a sequence of the information data pieces in response to the clock signal, a grayscale voltage generation part converting each of the n information data pieces output from the data taking-in part into n grayscale voltages having analog voltage values, and an output part supplying n driving voltages, which are obtained by amplifying the n grayscale voltages, to the n data lines of the display panel.

DESCRIPTION OF THE EMBODIMENTS

Embodiments of the disclosure provide a data communication system with high communication efficiency, a transmission circuit, and a display device including the data communication system.

In a data communication system according to an embodiment of the disclosure, a transmission circuit transmits an information data signal in the form of a serial signal including a converted information data piece obtained by adding or subtracting "1" to or from an N-bit (N is an integer of 2 or greater) information data piece. As the N-bit information data piece, N-bit data is adopted, the N-bit data excluding data patterns in which only a least significant bit is at a logic level 0 and all of the other bits are at a logic level 1, and data patterns in which all bits are at a logic level 1. Thereby, a rising or falling edge portion that transitions from a logic level 0 to a logic level 1 or from a logic level 1 to a logic level 0 appears at least once in a sequence of N-bit serial bits of the converted information data piece to be transmitted.

A reception circuit receives the information data signal transmitted from the transmission circuit, and generates a clock signal that is phase-synchronized with a timing of the rising or falling edge portion of the bit appearing in the N-bit serial bit sequence of the information data piece included in the information data signal. Further, the reception circuit restores the original information data by subtracting or adding "1" from or to the N-bit converted information data piece included in the received information data signal.

Thus, according to the data communication system of an embodiment of the disclosure, a PLL circuit on the reception circuit side can generate a clock signal without adding additional information such as clock bits for generating the clock signal to the N-bit information data piece included in the information data signal to be transmitted, and thus communication efficiency can be improved.

Examples of the disclosure will be described in detail below with reference to the drawings.

Example 1

Figure 1:
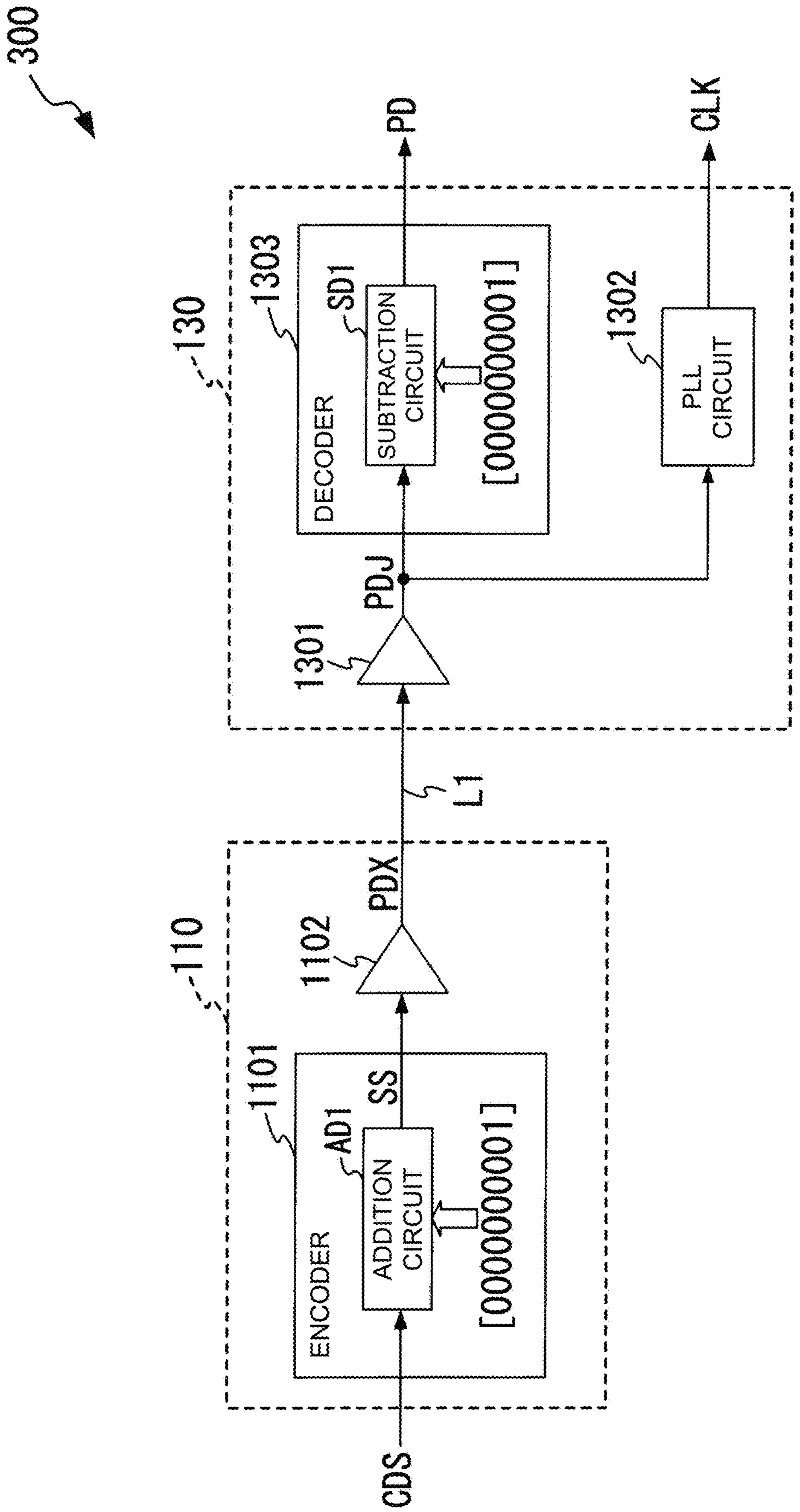
FIG. 1 is a block diagram showing a configuration of a data communication system 300 as a data communication system according to the disclosure.

FIG. 1 is a block diagram showing a configuration of a data communication system 300 according to the disclosure.

As shown in FIG. 1, the data communication system 300 includes a transmission circuit 110 and a reception circuit 130.

Figure 2A:
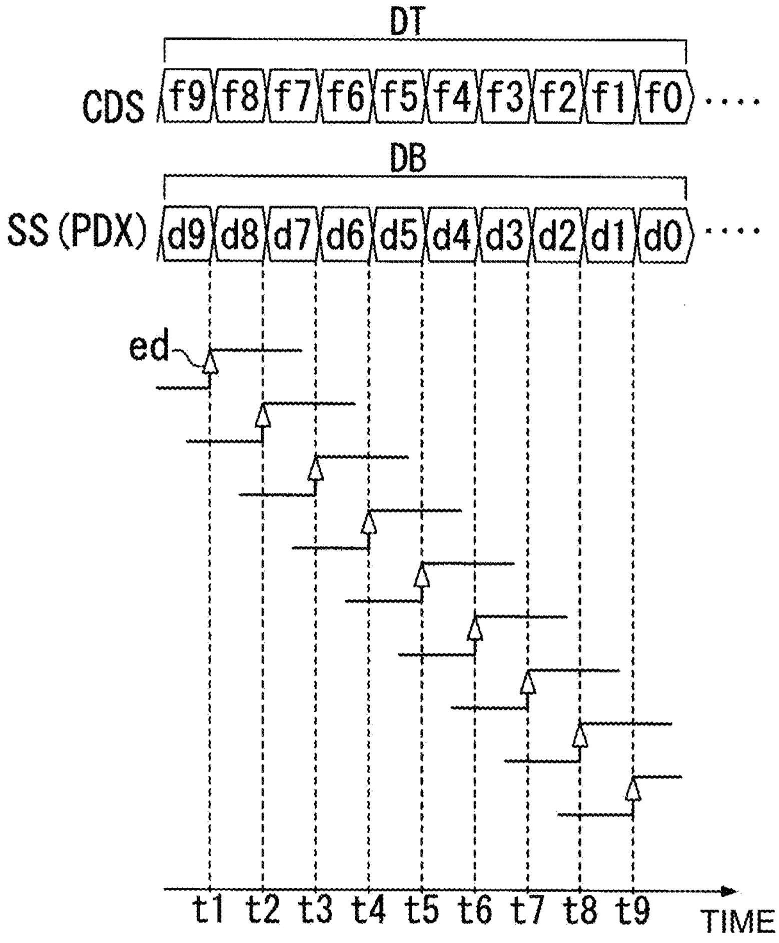
FIG. 2A is a diagram showing a part of the format of each of an information data sequence CDS, an information data signal SS, and PDX.
Figure 2B:
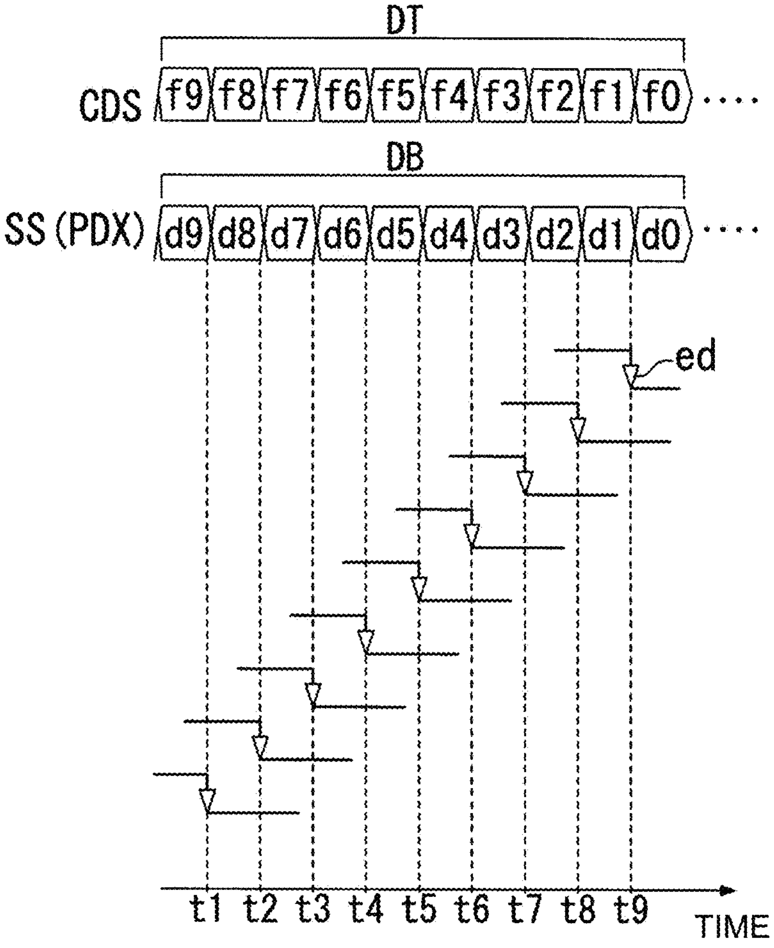
FIG. 2B is a diagram showing a part of the format of each of the information data sequence CDS, the information data signal SS, and PDX.

The transmission circuit 110 includes an encoder 1101 and a transmission amplifier 1102, and receives an information data sequence CDS including a sequence of pieces of information data DT each having the form of a serial signal of 10 bits (f9 to f0) as shown in FIG. 2A or FIG. 2B, for example.

An encoder 1101 includes an addition circuit AD1 and performs data conversion that causes logical level inversion at least once in the 10-bit bit sequence for each piece of information data DT included in the information data sequence CDS.

Specifically, the encoder 1101 adds "1" to a value represented by 10 bits (f9 to f0) of each piece of information data DT by the addition circuit AD1. In other words, the addition circuit AD1 adds 10-bit data [0000000001] in which only a least significant bit (LSB) is at a logic level 1 and all of the other bits are at a logic level 0 to 10 bits (f9 to f0) of the information data DT.

Then, the addition circuit AD1 supplies an information data signal SS including a sequence of pieces of 10-bit converted information data DB in a serial form as shown in FIG. 2A or FIG. 2B to the transmission amplifier 1102, the data DB being obtained by adding "1" to each piece of information data DT.

The transmission amplifier 1102 transmits a signal, which is obtained by amplifying such information data signal SS, to the reception circuit 130 via a transmission line L1 as an information data signal PDX.

In the data communication system 300, the range of 10 bits that can be received as information data DT to be transmitted is defined as [0000000000] to [1111111101].

That is, in the data communication system 300, it is defined that data patterns other than a data pattern [1111111111] in which all bits are at a logic level 1 and a data pattern [1111111110] in which only a least significant bit is at a logic level 0 are used as the information data DT among data patterns [0000000000] in which all bits are at a logic level 0 to data patterns [1111111111] in which all bits are at a logic level 1.

Thereby, as shown in FIG. 2A or FIG. 2B, in the 10-bit bit sequence (d9 to d0) of each of the pieces of converted information data DB included in the information data signal PDX, a rising or falling edge ed that transitions from a logic level 0 to a logic level 1 or from a logic level 1 to a logic level 0 appears at at least one point in time among points in time t1 to t9 at boundaries between adjacent bits.

The reception circuit 130 includes a reception amplifier 1301, a phase locked loop (PLL) circuit 1302, and a decoder 1303.

The reception amplifier 1301 receives the information data signal PDX transmitted from the transmission circuit 110, and supplies a signal, which is obtained by amplifying the information data signal PDX, to the PLL circuit 1302 and the decoder 1303 as a received information data signal PDJ.

The PLL circuit 1302 generates an oscillation signal which is synchronized with the phase of the rising or falling edge ed appearing in the 10-bit bit sequence (d9 to do) of each of the pieces of converted information data DB shown in FIG. 2A or FIG. 2B and is included in the received information data signal PDJ, and outputs the oscillation signal as a clock signal CLK.

The decoder 1303 includes a subtraction circuit SD1, and performs processing for returning the pieces of converted information data DB converted by the encoder 1101 of the transmission circuit 110 to the original information data DT on the received information data signal PDJ.

Specifically, the decoder 1303 subtracts, by the subtraction circuit SD1, "1" added by the addition circuit AD1 described above from the value represented by 10 bits (d9 to d0) of each of the pieces of converted information data DB included in the received information data signal PDJ. That is, the subtraction circuit SD1 subtracts 10-bit data [0000000001] in which only a least significant bit is at a logic level 1 and all of the other bits are at a logic level 0 from 10 bits (f9 to f0) of the converted information data DB.

Thereby, each of the pieces of 10-bit information data DT included in the information data sequence CDS is restored, and the subtraction circuit SD1 outputs a signal including the sequence of the restored information data DT as an information data signal PD.

Thus, according to the data communication system 300 shown in FIG. 1, in a serial bit sequence of 10 bits (d9 to d0) of each of the pieces of converted information data DB included in the information data signal PDX transmitted by the transmission circuit 110, a rising or falling edge that transitions from a logic level 0 to a logic level 1 or from a logic level 1 to a logic level 0 appears at least once. Thereby, it is possible to generate, by the PLL circuit 1302 included in the reception circuit 130, a satisfactory clock signal CLK which is phase-synchronized with each bit without adding information such as clock bits for generating clock signals to each of the pieces of converted information data DB.

Thus, according to the data communication system 300 shown in FIG. 1, it is possible to improve communication efficiency as information for generating a clock signal becomes unnecessary in the information data signal PDX transmitted through the transmission line L1.

In the data communication system 300 shown in FIG. 1, the transmission circuit 110 adds "1" to each of the pieces of information data DT included in the information data sequence CDS by using the addition circuit AD1, and the reception circuit 130 subtracts "1" from each of the pieces of converted information data DB included in the received information data signal PDX (PDJ) by using the subtraction circuit SD1, but the disclosure is not limited to such a configuration. Furthermore, the values added and subtracted by the addition circuit AD1 and the subtraction circuit SD1 may be values other than "1". That is, when the addition circuit AD1 adds "X" (X is a value other than 1) to the information data DT, the subtraction circuit SD1 only needs to subtract the "X" from the converted information data DB.

Example 2

Figure 3:
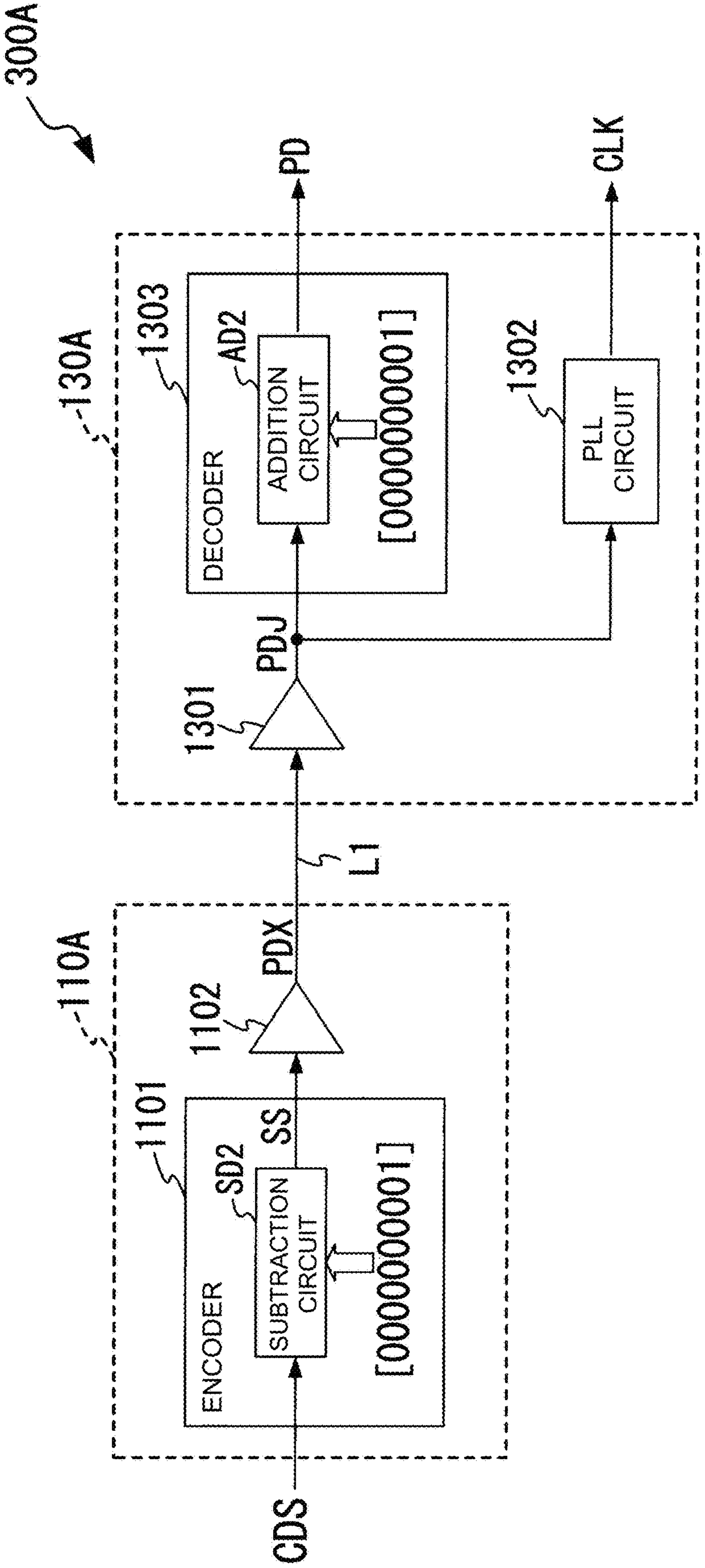
FIG. 3 is a block diagram showing a configuration of a data communication system 300A as another example of the data communication system according to the disclosure.

FIG. 3 is a block diagram showing a configuration of a data communication system 300A as another example of a data communication system.

In the data communication system 300A, a transmission circuit 110A is adopted instead of the transmission circuit 110, and a reception circuit 130A is adopted instead of the reception circuit 130.

FIG. 3 shows the same configurations as those shown in FIG. 1 except that the transmission circuit 110A adopts a subtraction circuit SD2 as a processing circuit included in the encoder 1101 instead of the addition circuit AD1 shown in FIG. 1, and the reception circuit 130A adopts an addition circuit AD2 as a processing circuit included in the decoder 1303 instead of the subtraction circuit SD1 shown in FIG. 1.

Here, the subtraction circuit SD2 shown in FIG. 3 subtracts "1", that is, 10-bit data [0000000001] from each display data piece included in the information data sequence CDS, and supplies the obtained result to the transmission amplifier 1102 as an information data signal SS. Further, the addition circuit AD2 shown in FIG. 3 adds "1" subtracted by the subtraction circuit SD2 described above to each of the pieces of converted information data DB included in the received information data signal PDJ to restore each of the pieces of information data DT included in the information data sequence CDS, and outputs a signal including a sequence of the restored information data DT as an information data signal PD.

However, in the data communication system 300A, the range of 10 bits that can be received as the information data DT to be transmitted is defined as [0000000010] to [1111111111]. That is, in the data communication system 300A, it is defined that data patterns other than a data pattern [0000000000] in which all bits are at a logic level 0 and a data pattern [0000000001] in which only a least significant bit is at a logic level 1 are used as the information data DT among data patterns [0000000000] in which all bits are at a logic level 0 to data patterns in which all bits are at a logic level 1.

In the data communication system 300 or 300A described above, the number of bits of the information data (DT, DB) transmitted by the transmission circuit 110 or 110A is 10 bits, but the number of bits is not limited to 10 bits, and may be 2 bits or more.

In short, the data communication system according to the disclosure may have the following transmission circuit and reception circuit.

The transmission circuit (110) includes an encoder (1101) that receives an information data piece (DT) composed of N bits (N is an integer of 2 or greater) and generates a converted information data piece (DB) in a serial form composed of first to n-th bits representing values obtained by adding (or subtracting) 1 to values represented by the information data piece, and transmits an information data signal (PDX) including the converted information data piece.

The reception circuit (130) includes a PLL circuit (1302) that receives an information data signal (PDX) and generates a clock signal (CLK) that is phase-synchronized with a rising edge or a falling edge of the information data signal, and a decoder (1303) that receives the information data signal (PDX) and subtracts 1 from a value represented by a converted information data piece (DB) included in the information data signal to restore an information data piece (DT).

Example 3

Figure 4:
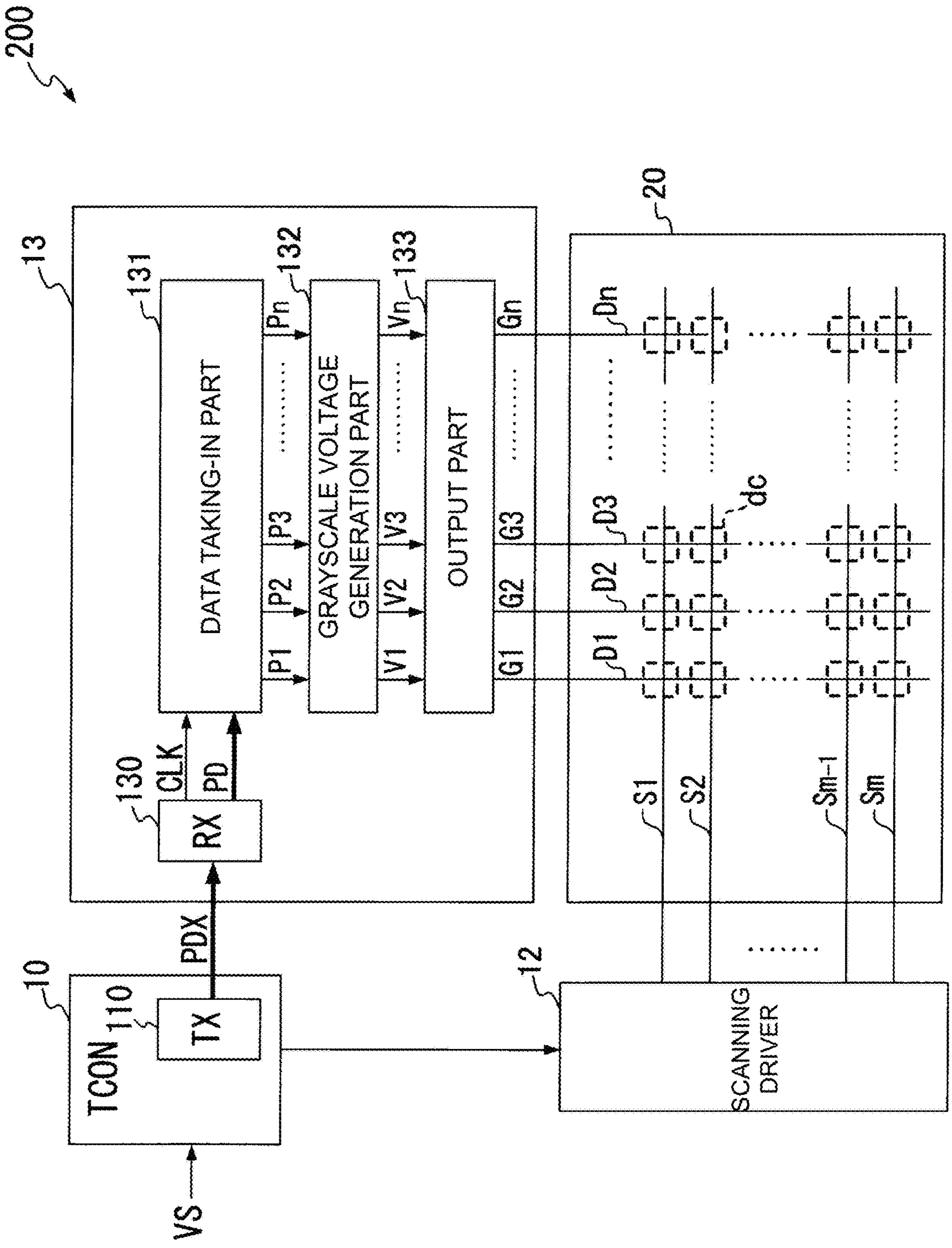
FIG. 4 is a block diagram showing a configuration of a display device 200 equipped with the data communication system according to the disclosure.

FIG. 4 is a block diagram showing a configuration of a display device 200 equipped with the data communication system according to the disclosure.

As shown in FIG. 4, the display device 200 includes a timing controller (TCON) 10, a scanning driver 12, a data driver 13, and a display panel 20.

In the display panel 20, horizontal scanning lines SI to Sm (m is an integer of 2 or greater) each extending in the horizontal direction of a two-dimensional screen and data lines DI to Dn (n is an integer of 2 or greater) each extending in the vertical direction of the two-dimensional screen are disposed to intersect each other. At an intersection between each of the horizontal scanning lines and each of the data lines, a display cell de as, for example, a liquid crystal display element is formed.

The timing controller 10 receives a video signal VS, detects a horizontal synchronization signal from the video signal VS, and supplies the horizontal synchronization signal to the scanning driver 12. The scanning driver 12 sequentially applies a scanning pulse signal synchronized with the horizontal synchronization signal to each of the horizontal scanning lines SI to Sm of the display panel 20.

Further, the timing controller 10 performs color depth expansion processing for expanding the color depth to 10 bits on a display data piece in which the luminance level of each display cell based on the video signal VS is represented by, for example, 8 bits. The timing controller 10 includes a transmission circuit (TX) 110, and the transmission circuit 110 performs data conversion processing for causing logical level inversion at least once in a 10-bit bit sequence on each of 10-bit serial display data pieces that have been subjected to the color depth expansion processing described above. Then, the timing controller 10 transmits a signal in which the converted display data pieces after the data conversion processing are serially connected to each other to the data driver 13 as a video data signal PDX.

The data driver 13 includes a reception circuit (RX) 130 that receives the video data signal PDX, a data taking-in part 131, a grayscale voltage generation part 132, and an output part 133.

The reception circuit 130 generates a clock signal that is phase-synchronized with the received video data signal PDX, and supplies the clock signal to the data taking-in part 131 as a clock signal CLK. Furthermore, the reception circuit 130 restores each of the converted display data pieces included in the received video data signal PDX to the original display data piece by using the decoder 1303, and supplies a video data signal PD including the sequence of the display data pieces to the data taking-in part 131.

The data taking-in part 131 receives the above-described clock signal CLK and video data signal PD from the reception circuit 130, and takes in the display data pieces included in the video data signal PD for each horizontal scanning line, that is, every n display data pieces in response to the clock signal CLK. The data taking-in part 131 sets the taken-in n display data pieces as pieces of display data P1 to Pn, and supplies the display data P1 to Pn to the grayscale voltage generation part 132. The grayscale voltage generation part 132 converts the display data P1 to Pn supplied from the data taking-in part 131 into grayscale voltages V1 to Vn having voltage values corresponding to the respective luminance levels, and supplies the grayscale voltages to the output part 133. The output part 133 supplies driving voltages G1 to Gn obtained by amplifying the grayscale voltages V1 to Vn individually to the data lines DI to Dn of the display panel 20.

The display device 200 is equipped with the data communication system shown in FIG. 1 or FIG. 3 as the transmission circuit 110 included in the timing controller 10 and the reception circuit 130 included in the data driver 13.

That is, when the data communication system 300 (300A) is adopted, the timing controller 10 performs the above-described color depth expansion processing on each of display data pieces in which the luminance level of each display cell based on the input video signal VS is represented by 8 bits, and supplies a sequence of display data pieces in which the number of bits is expanded to 10 bits to the transmission circuit 110 (110A) as an information data sequence CDS. Here, the transmission circuit 110 (110A) generates values, which are obtained by adding (or subtracting) 1 to values represented by information data pieces for the pieces of information data pieces in the information data sequence CDS by the encoder 1101, as 10-bit converted information data pieces represented in a serial form. Then, the transmission circuit 110 (110A) transmits an information data signal, which is obtained by amplifying an information data signal SS including a sequence of the converted information data pieces by the transmission amplifier 1102, to the reception circuit 130 of the data driver 13 through the transmission line L1 as a video data signal PDX.

The reception circuit 130 included in the data driver 13 receives the video data signal PDX transmitted from the transmission circuit 110 of the timing controller 10, and takes in the video data signal PDX via the reception amplifier 1301 as a received information data signal PDJ. At this time, the decoder 1303 included in the reception circuit 130 subtracts (or adds) "1" from the value represented by 10 bits (d9 to d0) of each of the pieces of converted information data DB included in the received information data signal PDJ to restore each of the 10-bit display data pieces included in the information data sequence CDS described above, and supplies a signal including a sequence of the restored display data pieces to the data taking-in part 131 as a video data signal PD. Furthermore, the reception circuit 130 included in the data driver 13 supplies a clock signal CLK output by the PLL circuit 1302 to the data taking-in part 131 in response to the received information data signal PDJ.

When the data communication system 300 (300A) is adopted in the display device 200, it is defined that a lowest luminance level to a highest luminance level are expressed in a range of 10-bit data [0000000000] to [1111111101] or 10-bit data [0000000010] to [1111111111] for a display data piece in which a color depth is expanded to 10 bits.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A data communication system comprising:

a transmission circuit including an encoder that receives a N-bit information data piece composed of N bits and generates a N-bit converted information data piece in a serial form composed of first to N-th bits representing a value, which is obtained by only adding predefined N-bit data having a value of 1 to the N-bit information data piece, and transmitting an information data signal that is obtained by amplifying the N-bit converted information data piece, N being an integer of 2 or greater; and a reception circuit including a PLL circuit that receives the information data signal composed of N bits and generates a clock signal that is phase-synchronized with a rising edge or a falling edge of the information data signal, and a decoder that receives the information data signal and only subtracts the predefined N-bit data having the value of 1 from the N-bit converted information data piece included in the information data signal to restore the N-bit information data piece, wherein a least significant bit (LSB) of the predefined N-bit data having the value of 1 is at a first logic level, and other bits of the predefined N-bit data having the value of 1 are at a second logic level.

2. The data communication system according to claim 1, wherein the data communication system is defined that the N-bit information data piece does not use a data pattern in which all of the N bits are at a logic level 1 and a data pattern in which only a least significant bit is at a logic level 0 within a range from a data pattern in which all of the N bits are at a logic level 0 to a data pattern in which all of the N bits are at a logic level 1.

3. A data communication system comprising:

a transmission circuit including an encoder that receives a N-bit information data piece composed of N bits and generates a N-bit converted information data piece in a serial form composed of first to N-th bits representing a value, which is obtained by only subtracting predefined N-bit data having a value of 1 from the N-bit information data piece, and transmitting an information data signal that is obtained by amplifying the N-bit converted information data piece, N being an integer of 2 or greater; and a reception circuit including a PLL circuit that receives the information data signal composed of N bits and generates a clock signal that is phase-synchronized with a rising edge or a falling edge of the information data signal, and a decoder that receives the information data signal and only adds the predefined N-bit data having the value of 1 to the N-bit converted information data piece included in the information data signal to restore the N-bit information data piece, wherein a least significant bit (LSB) of the predefined N-bit data having the value of 1 is at a first logic level, and other bits of the predefined N-bit data having the value of 1 are at a second logic level.

4. The data communication system according to claim 3, wherein the data communication system is defined that the N-bit information data piece does not use a data pattern in which all of the N bits are at a logic level 0 and a data pattern in which only a least significant bit is at a logic level 1 within a range from a data pattern in which all of the N bits are at a logic level 0 to a data pattern in which all of the N bits are at a logic level 1.

5. A display device comprising:

a display panel that has n data lines to which a plurality of display cells are connected, n being an integer of 2 or greater;

a data driver that drives the display panel; and a timing controller that includes a transmission circuit including an encoder and transmitting an information data signal that is obtained by amplifying a sequence of N-bit converted information data pieces to the data driver, the encoder generating a value, which is obtained by only adding predefined N-bit data having a value of 1 a N-bit information data piece, as the sequence of the N-bit converted information data pieces represented in a form of serial first to N-th bits, with respect to each of information data pieces of N bits obtained by performing color depth expansion processing for expanding a color depth for each of display data pieces in which a luminance level of each of the display cells based on a video signal is represented by K bits, K being an integer of 2 or greater, and N being an integer greater than K, wherein the data driver includes a reception circuit including a PLL circuit that receives the information data signal composed of N bits and generates a clock signal that is phase-synchronized with a rising edge or a falling edge of the information data signal, and a decoder that receives the information data signal and only subtracts the predefined N-bit data having the value of 1 from the N-bit converted information data piece with respect to each of the N-bit converted information data pieces included in the information data signal to restore the N-bit information data piece, a data taking-in part taking in and outputting n information data pieces in a sequence of the N-bit information data pieces in response to the clock signal, a grayscale voltage generation part converting each of the n information data pieces output from the data taking-in part into n grayscale voltages having analog voltage values, and an output part supplying n driving voltages, which are obtained by amplifying the n grayscale voltages, to the n data lines of the display panel, wherein a least significant bit (LSB) of the predefined N-bit data having the value of 1 is at a first logic level, and other bits of the predefined N-bit data having the value of 1 are at a second logic level.

6. The display device according to claim 5, wherein the N-bit information data piece does not use a data pattern in which all of the N bits are at a logic level 1 and a data pattern in which only a least significant bit is at a logic level 0 within a range from a data pattern in which all of the N bits are at a logic level 0 to a data pattern in which all of the N bits are at a logic level 1.

7. The display device according to claim 5, wherein the display panel has m horizontal scanning lines to which the plurality of display cells are connected and which are disposed to intersect with the n data lines, m being an integer of 2 or greater.

8. The display device according to claim 7, further comprising:

a scanning driver that drives the display panel and is connected to the m horizontal scanning lines, wherein the timing controller detects a horizontal synchronization signal from the video signal and supplies a horizontal synchronization signal to the scanning driver.

* * * * *